United States Patent
Simon et al.

(10) Patent No.: US 11,001,113 B2
(45) Date of Patent: May 11, 2021

(54) DUAL-RATE LEAF SPRING SUSPENSION FOR A VEHICLE

(71) Applicant: FORD GLOBAL TECHNOLOGIES, LLC, Dearborn, MI (US)

(72) Inventors: Marc Simon, Cologne (DE); Thomas Gerhards, Niederzier (DE); Ralf Hintzen, Aachen (DE); Rainer Souschek, Aachen (DE); Nicole Zandbergen, Wuerselen (DE)

(73) Assignee: Ford Global Technologies, LLC, Dearborn, MI (US)

(*) Notice: Subject to any disclaimer, the term of this patent is extended or adjusted under 35 U.S.C. 154(b) by 197 days.

(21) Appl. No.: 16/161,523

(22) Filed: Oct. 16, 2018

(65) Prior Publication Data
US 2019/0111749 A1   Apr. 18, 2019

(30) Foreign Application Priority Data
Oct. 16, 2017   (DE) .................... 10 2017 218 431.0

(51) Int. Cl.
*B60G 11/10*   (2006.01)
*B60G 11/04*   (2006.01)
(Continued)

(52) U.S. Cl.
CPC .............. *B60G 11/10* (2013.01); *B60G 11/04* (2013.01); *B60G 11/38* (2013.01); *B60G 11/42* (2013.01);
(Continued)

(58) Field of Classification Search
CPC ......... B60G 11/04; B60G 11/10; B60G 11/12; B60G 11/38; B60G 11/42; B60G 17/023; B60G 17/06
See application file for complete search history.

(56) References Cited

U.S. PATENT DOCUMENTS

| 1,524,908 | A | * | 2/1925 | Brewster | ................. | B60G 11/38 |
| | | | | | | 267/45 |
| 1,528,481 | A | * | 3/1925 | Hersey | ................... | B60G 11/38 |
| | | | | | | 267/30 |

(Continued)

FOREIGN PATENT DOCUMENTS

| DE | 3035915 A1 | 4/1982 |
| DE | 4112213 C1 | 5/1992 |

(Continued)

OTHER PUBLICATIONS

DE Examination Report DE 10 2017 218 431.0 dated Oct. 31, 2018. 6 pages.

*Primary Examiner* — Barry Gooden, Jr.
(74) *Attorney, Agent, or Firm* — Raymond L. Coppiellie; Brooks Kushman P.C.

(57) ABSTRACT

An axle suspension for a vehicle includes a spring assembly with a leaf spring and a connecting arm, wherein the leaf spring supports a vehicle axle and, on an end side, is pivotably connected to a vehicle structure and pivotably connected to the connecting arm. In order to provide an optimized axle suspension with two-stage suspension, the spring assembly in a region of the connecting arm has a first stop element and the vehicle structure has a second stop element, which stop elements under normal load of the vehicle are spaced apart from one another and, when a limit load is exceeded, contact one another, whereby at least one stop element is elastically deformable.

15 Claims, 3 Drawing Sheets

(51) Int. Cl.
*B60G 11/38* (2006.01)
*B60G 11/42* (2006.01)

(52) U.S. Cl.
CPC .. *B60G 2202/112* (2013.01); *B60G 2202/143* (2013.01); *B60G 2204/121* (2013.01); *B60G 2204/125* (2013.01)

(56) References Cited

U.S. PATENT DOCUMENTS

| | | | | |
|---|---|---|---|---|
| 1,689,884 A * | 10/1928 | McComb | ............... | B60G 11/42 267/258 |
| 1,827,284 A * | 10/1931 | Dootson | ............... | B60G 11/42 267/30 |
| 2,150,622 A * | 3/1939 | Hendrickson | .......... | B60G 11/04 267/243 |
| 2,917,304 A * | 12/1959 | Nilsson | ............... | B60G 11/225 267/189 |
| 3,030,101 A * | 4/1962 | McIntosh | ............... | B60G 11/12 267/270 |
| 3,137,488 A * | 6/1964 | Toyer | ..................... | B60G 7/04 267/269 |
| 3,294,390 A * | 12/1966 | Warmkessel | ....... | B60G 17/0275 267/31 |
| 3,970,293 A | 7/1976 | Sweet et al. | | |
| 4,046,395 A * | 9/1977 | Smith, III | ............... | B60G 11/04 280/790 |
| 4,420,171 A | 12/1983 | Raidel | | |
| 4,919,449 A * | 4/1990 | Toms | ..................... | B60G 3/26 280/124.153 |
| 4,988,080 A | 1/1991 | Shah | | |
| 5,098,121 A | 3/1992 | Walton et al. | | |
| 5,217,248 A | 6/1993 | Reast | | |
| 5,351,986 A | 10/1994 | Hedenberg | | |
| 5,535,993 A * | 7/1996 | Hansen | ................... | B60G 7/04 267/263 |
| 5,820,147 A * | 10/1998 | Rohweder | ............... | B60G 9/00 280/93.51 |
| 6,019,384 A | 2/2000 | Finck | | |
| 6,176,478 B1 | 1/2001 | Heitzmann | | |
| 6,371,466 B1 * | 4/2002 | Spears | ..................... | B60G 7/04 267/265 |
| 7,950,678 B1 | 5/2011 | Bauder | | |
| 2004/0155424 A1 | 8/2004 | Hicks et al. | | |
| 2009/0115157 A1 * | 5/2009 | Platner | ................. | B60G 11/107 280/124.176 |
| 2009/0302513 A1 * | 12/2009 | Enomoto | ............... | B60G 11/04 267/39 |
| 2011/0057409 A1 | 3/2011 | Leeder | | |
| 2012/0098229 A1 * | 4/2012 | Hochapfel | ........... | B60G 11/107 280/124.134 |
| 2014/0035248 A1 * | 2/2014 | Dilworth | ................ | B60G 11/04 280/124.106 |
| 2014/0117640 A1 * | 5/2014 | Lamberti | .............. | F16F 3/0873 280/124.164 |
| 2015/0145187 A1 * | 5/2015 | Soles | ..................... | B60G 11/42 267/30 |
| 2016/0152106 A1 * | 6/2016 | Preijert | ................. | B60G 11/04 280/124.116 |
| 2018/0272820 A1 * | 9/2018 | Wolf-Monheim | ..... | B60G 11/04 |
| 2019/0111749 A1 | 4/2019 | Simon et al. | | |
| 2019/0168560 A1 * | 6/2019 | David | .................... | B60G 11/08 |

FOREIGN PATENT DOCUMENTS

| | | |
|---|---|---|
| DE | 102005032611 A1 | 1/2007 |
| GB | 488894 A | 7/1938 |
| GB | 807422 A | 1/1959 |
| GB | 915402 A | 1/1963 |
| GB | 1212411 A | 11/1970 |
| GB | 1515362 A | 6/1978 |
| GB | 2195589 A | 4/1988 |
| JP | 2015006825 A | 1/2015 |

\* cited by examiner

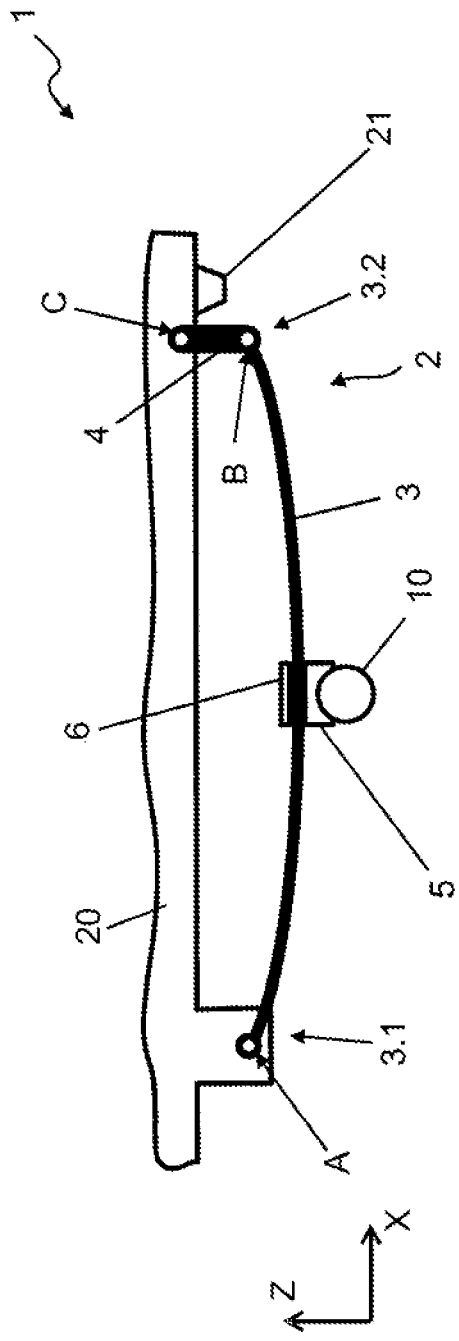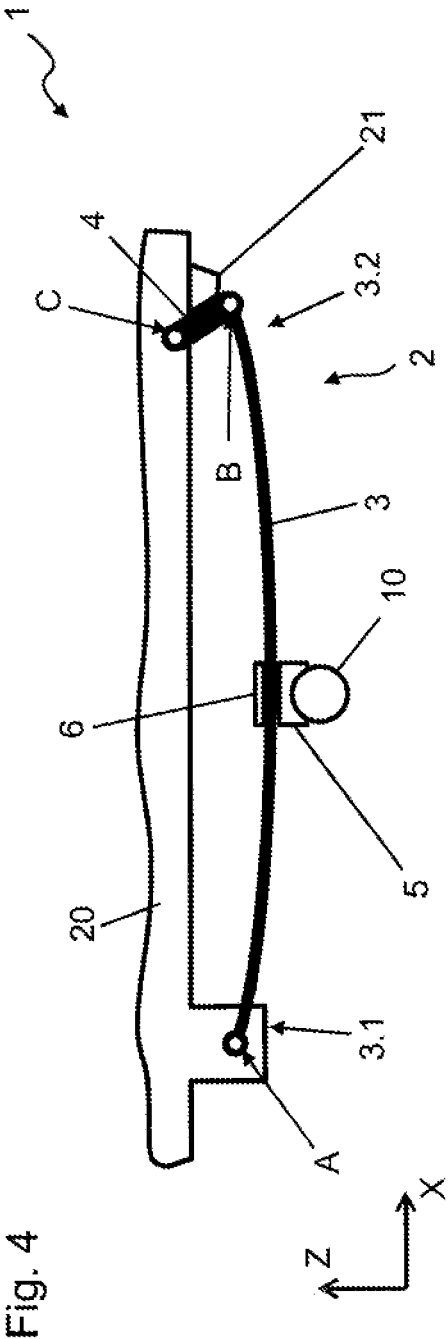

DUAL-RATE LEAF SPRING SUSPENSION FOR A VEHICLE

CROSS-REFERENCE TO RELATED APPLICATIONS

This application claims foreign priority benefits under 35 U.S.C. § 119(a)-(d) to DE Application 10 2017 218 431.0 filed Oct. 16, 2017, which is hereby incorporated by reference in its entirety.

TECHNICAL FIELD

The invention relates to an axle suspension having a spring subassembly with a leaf spring and a shackle, wherein the leaf spring bears a vehicle axle and has a first end pivotably connected to a vehicle structure and a second end pivotably connected to the shackle, wherein the shackle is pivotably connected to the vehicle structure.

BACKGROUND

In a wheel suspension of modern motor vehicles different types of springs is used, an actual vehicle structure being connected thereby to wheels of a vehicle. In this case, in addition to spiral springs, leaf springs are also used, amongst others, in particular in the case of rigid axles. Such a leaf spring extends along a longitudinal axis of the vehicle and generally has a concave shape, for example in the manner of a parabola. In addition to leaf springs made of spring steel, leaf springs made of composite material, for example fiber-reinforced plastic, are sometimes also used. Individual springs or even spring assemblies consisting of two or more springs may be used. At least one spring is normally connected in a central region via a clamping device, for example by spring clips, to the axle to be sprung.

Often in the case of a sprung axle it is desirable to produce two different spring constants or rates. Up to a specific limit load, the axle is intended to be sprung with a lower spring constant and/or stiffness. This corresponds to smaller spring movements that arise during normal operation of the vehicle. In this case it is generally advantageous if a reaction of the suspension is not too firm. A higher spring constant or rate is intended to be provided above a limit load. This also corresponds to a longer suspension deflection that is not generally reached, for example, during normal operation of the vehicle, but is only reached in individual situations such as for example traveling over a pothole or the like. In this case, it is advantageous if the reaction of the suspension is firmer (compared with during normal operation) in order to prevent, for example, parts from bottoming out, i.e. parts colliding with one another. In the case of the parts bottoming out in this manner, for example, the sprung axle could collide with a part of a vehicle structure, whereby in the worst case, parts of the vehicle could be damaged. Spring systems that, as described above, react with two different spring constants according to the load are also denoted as two-stage springs or dual-rate suspensions.

One possibility for implementing two different spring rates as known from the prior art consists in that two (or more) leaf springs are arranged in the form of a spring assembly, wherein a primary spring serves for attachment to the vehicle structure and thus continuously contributes to the suspension. A secondary spring is connected to the primary spring, but due to its shape is only subjected to deformation in the event of greater deformation of the primary spring. In other words, the secondary spring produces a restoring force only in the case of greater deformation, i.e. in the case of a larger (dynamic) axle load. This system functions satisfactorily in principle but is associated with drawbacks. Firstly, a mass of the spring assembly is increased by the secondary spring and a required means for connecting to the primary spring. The secondary spring in this case has to take account of the unsprung mass, which is generally intended to be kept as low as possible. Moreover, by an arrangement of a plurality of springs one above the other, a larger constructional space is required than in the case of an individual leaf spring. It is not possible to compensate for this by a thinner design of the primary spring, or only to a limited extent, since below a limit load, this primary spring undertakes a support function of the axle alone, for which it requires a certain material strength.

GB 915,402 A discloses a spring arrangement with a semi-elliptical spring, which at a front end is connected by a first pivot pin to a vehicle structure and at a rear end is supported at two points on a connecting element that in turn is connected by a second pivot pin to the vehicle structure. The connecting element bears against a rubber element, which is fastened to the vehicle structure and cooperates therewith. In the case of compression of the suspension, a connecting element is rotated, which is associated with a deformation of the rubber element.

U.S. Pat. No. 6,019,348 A discloses a spring arrangement with a leaf spring assembly, a front end thereof being connected by a pivot pin fastened in a stationary manner to a vehicle structure. A rear end is pivotably connected to a first connecting arm, which in turn is connected to a second connecting arm. When pivoting the connecting arms relative to one another, a restoring force is produced via torsion of an interposed rubber element. The second connecting arm is pivotably mounted on the vehicle structure. On the end side, the second connecting arm has an elastomer stopper element, which in the case of significant compression of the suspension cooperates with an upper face of the leaf spring assembly.

A leaf spring structure is disclosed in U.S. Pat. No. 4,988,080 A, said leaf spring structure comprising a leaf spring, which consists of fiber-reinforced resin and supports a vehicle axle, a connecting device for connecting spring ends to a vehicle chassis and a elastic bumper. Said elastic bumper has an upper end connected to a vehicle chassis and is arranged such that under load conditions, the elastic bumper comes into engagement with the upper surface of the leaf spring, wherein the bumper is tapered downwardly and its upper end has a greater longitudinal dimension than a lower end.

GB 1 212 411 A1 discloses a leaf spring suspension with a leaf spring, which at one end is connected by a pivot pin to a vehicle structure through an eye. At the other end, the leaf spring is fixedly connected to a support arranged thereabove. In turn, two rubber elements are bonded onto this support, said rubber elements, on the other hand, being bonded onto two further supports that are fixedly connected to the vehicle structure.

U.S. Pat. No. 6,176,478 B1 discloses a rear axle suspension for a motor vehicle in which an axle is sprung via a leaf spring assembly. The leaf spring assembly is mounted at a front end via a pivot pin fixed to the vehicle structure. At a rear end the leaf spring assembly is clamped in a spring carrier, which on the vehicle side is fastened via two adjacent rubber blocks of a shear spring. In the case of one of the rubber blocks being broken off, a rubber cushion is fastened on the vehicle side above the spring carrier, said rubber cushion damping the impact of the leaf spring assembly on the vehicle structure.

In view of the prior art set forth, the provision of a two-stage suspension with optimized constructional space and optimized dynamics leaves further room for improvement.

SUMMARY

The object of the disclosure is to provide an optimized axle suspension with two-stage suspension.

It should be mentioned that the features and measures that are disclosed individually in the following description may be combined together in any technically expedient manner and reveal further embodiments of the disclosure. The description characterizes and specifies the disclosure, in particular, additionally in connection with the Figures.

By means of the disclosure, an axle suspension for a vehicle is provided. The vehicle may be, in particular, a motor vehicle such as a truck or passenger motor vehicle. However, for example, an application for trailers is also possible. The axle suspension is generally a rear axle suspension, in particular a rigid axle suspension.

The axle suspension comprises a spring assembly with a leaf spring and a connecting arm, wherein the leaf spring supports a vehicle axle and on an end side, on the one hand, is pivotably connected to a vehicle structure and, on the other hand, is pivotably connected to the connecting arm, which is pivotably connected to the vehicle structure.

The leaf spring in this context may be called a longitudinal leaf spring as it is oriented predominantly or generally along a vehicle longitudinal axis (X-axis). In this case, at least in an unloaded state, the leaf spring does not extend exactly parallel to an X-axis but rather has a concave-up curvature, for example in the manner of a parabolic spring. All references to the X-axis (longitudinal axis), Y-axis (transverse axis) and Z-axis (vertical axis) of the vehicle refer in this case and hereinafter to a state of the spring assembly installed as intended.

The leaf spring supports a vehicle axle and at a first end (normally its forward end, relative to the vehicle) is pivotably connected to the vehicle sprung structure and at an opposite second end (normally at a rear end, relative to the vehicle) is pivotably connected to the connecting arm. This connecting arm, which may also be denoted as a shackle, in turn is pivotably connected to the vehicle sprung structure. The respective pivot pins in this case extend parallel to the Y-axis. The disclosed structure corresponds substantially to a Hotchkis suspension. Whilst here it is a case of one connecting arm, naturally two connecting arms may be provided so as to be arranged on both sides of the leaf spring and/or the connecting arm may be configured in two parts. In the known manner, bearing eyes may be formed at the front end and at the rear end of the leaf spring, for example rubber-metal bushings being able to be pressed therein. A respective bearing eye and/or the bushing arranged therein correspond to a position of an axle bolt, a pivotable and/or rotatable connection being provided thereby.

Overall, the leaf spring serves for elastic suspension of the vehicle axle relative to the vehicle structure. In this case "vehicle structure" is a collective term for a body, a chassis and optionally a subframe of the respective vehicle, i.e. those parts that normally form the sprung mass of the vehicle. The connection between the vehicle axle which, in particular, may be configured as a rigid axle, is normally provided via a clamping device, which, for example, may have an upper and a lower clamping element that may be configured to be comparatively rigid, for example made from steel. The leaf spring in this case is clamped between the clamping elements, optionally via interposed elastic insulating elements. The clamping of the clamping elements to one another may take place via spring clips. Normally spring assemblies are intended to be avoided within the scope of the disclosure, which is why the spring assembly preferably has an individual leaf spring.

According to the disclosure, the spring assembly in a region of the connecting arm comprises a first stop element and the vehicle structure comprises a second stop element, which stop elements under normal load of the vehicle are spaced apart from one another and, when a limit load is exceeded, are able to be brought into contact with one another, whereby at least one stop element is elastically deformable. The spring assembly has, therefore, (at least) one first stop element directly on the connecting arm or in the vicinity thereof, wherein a plurality of first stop elements may also be provided. This forms to a certain extent a counterpart to (at least) one second stop element of the vehicle structure. The axle suspension is designed such that under normal load of the vehicle, a spacing is provided between the at least one first stop element and the at least one second stop element. A normal load of the vehicle in this case corresponds to the unloaded state without action of dynamic load, which occur, for example, when traveling over uneven ground. In this state, therefore, there is no interaction between the stop elements, and the spring behavior of the axle suspension is determined by the leaf spring. This applies until a limit load is reached when the first and the second stop elements come into contact with one another. The limit load is greater than the normal load, wherein within the scope of the disclosure a difference between these two loads may be freely selected in principle. For example, the limit load could be 110%, 130% or 150% of the normal load but it could also be a higher value.

Since the stop elements come into contact with one another, at least one stop element is elastically deformable when contacted by the stop element. The elastic deformation causes a restoring force to be produced, which counteracts a further suspension compression. Due to its shape and/or its material, the elastic stop element in this case is configured such that it is subjected to a significantly greater deformation than other substantially rigid components, such as for example the vehicle structure or the connecting arm. An elastic stop element may also be denoted as a bumper element, damper element or spring element. Above the limit load, due to compression of the suspension caused by upward movement of the axle relative to the sprung vehicle structure, firstly a restoring force that is cause by elastic deformation of the leaf spring is produced, secondly a further restoring force that is based on the elastic deformation of the at least one elastically deformable stop element is produced. Thus, a higher effective spring constant is present after the limit load is exceeded and the elastically deformable stop becomes involved. Thus, a two-stage or dual-rate suspension is provided. By an increased effective stiffness, the dynamics of the vehicle may be adapted to a greater load, which has a positive effect on the handling, control and driving comfort. Also in the case of greater suspension compression, for example, it is possible to prevent the vehicle axle, the leaf spring or the connecting arm from striking against the vehicle structure. The greater stiffness may also contribute to stabilizing the vehicle.

In this case, it is advantageous that corresponding cooperation takes place in the region of the connecting arm and/or an adjacent end of the leaf spring. The respective elastic stop element may be configured to be space-saving in comparison with an additional leaf spring and is generally also more lightweight than an additional leaf spring. In this case, different embodiments, which are discussed further hereinafter, are conceivable. In some cases, an additional element on the spring assembly is not necessary, whereby the unsprung mass is kept small. However, in the case of embodiments in which an additional element is required as part of the unsprung mass, clear advantages are provided relative to an embodiment with an additional leaf spring. Firstly, in the case of a specific spring path, movements in the region of the connecting arm are smaller than in a region of the vehicle axle, where an additional leaf spring is arranged according to the prior art. In other words, acceleration of unsprung mass required during suspension compression is lower, which is why the spring assembly as a whole reacts in a more effective manner. Moreover, additional vertical constructional space does not have to be provided for the further leaf spring, i.e. the axle suspension according to the disclosure is more compact in this regard.

According to a preferred embodiment, the second stop element is elastically deformable. This may indicate, in particular, that the first stop element (in comparison with the second stop element) is configured to be non-elastic and/or rigid. As will become clearer hereinafter, a non-elastic stop element may be formed by an element that might otherwise be present in the case of a conventional Hotchkis suspension, whilst the elastic stop element has to be provided as an additional component. When this additional component is located on the vehicle structure, i.e. on the sprung mass, it acts advantageously on the unsprung mass since this is able to remain smaller.

In particular, but not exclusively, when the second stop element is configured to be elastic, it is preferable that the second stop element is rigidly fastened to the vehicle structure. In other words, the second stop element is fixed relative to the vehicle structure, i.e. the second stop element is neither rotatable nor displaceable. It is recognized that, by nature of its elastically deformable property, parts of the second stop element are displaceable relative to the vehicle structure (due to deformation) while the parts that are fastened remain fixed in position. By a rigid fastening of the second stop element to the vehicle structure, an interaction with the first stop element may be controlled in a more effective manner.

According to one embodiment, the connecting arm comprises a first stop element. This expressly includes a possibility that the first stop element is formed by the connecting arm. In this case, the first stop element is preferably non-elastic. Alternatively, a separately-produced component may be fastened to the connecting arm, said component forming the first stop element. In any case, the pivoting movement of the connecting arm ensures that the connecting arm and/or a stop element fastened thereto comes into contact with the second stop element and/or strikes thereagainst when the limit load is reached or exceeded. Optionally, in this case a surface of the second stop element, which faces the connecting arm, may extend perpendicular to a (tangential) direction of movement of the connecting arm. It goes without saying that forces acting on the connecting arm on the side of the second stop element may also be transmitted to the leaf spring.

According to a further embodiment, the leaf spring comprises a first stop element at a rear end thereof. In particular, the first stop element may be formed by the rear end of the leaf spring. Normally a bearing eye is configured at the rear end, the leaf spring being pivotably connected thereby to the connecting arm. This region, which may serve for receiving an axle bolt, comes into contact with the second stop element during pivoting movement of the connecting arm above the limit load. In this case, forces acting on the rear end on the side of the second stop element are also transmitted to the connecting arm. This embodiment may be combined with the above-described embodiment, i.e. the connecting arm may have a first stop element and the rear end of the leaf spring may have a first stop element, which both contact the second stop element above the limit load. It could also be said that the first stop element is configured in two parts, said first stop element being arranged partially on the connecting arm and partially on the leaf spring.

According to one embodiment, the elastic stop element is formed at least partially from an elastomer. The "elastic stop element" in this case is naturally the (first and/or second) stop element, which is of elastic configuration. The elastomer may, for example, be rubber or silicon. The elastic stop element in this case may also be denoted as rubber-elastic. In this case, for example, it is conceivable that a region facing the other stop element is configured to be non-elastic, for example in the form of a cap.

According to a further embodiment, the elastic stop element is formed at least partially from plastic. This also includes the possibility that it is a fiber-reinforced plastic. Moreover, the plastic and an elastomer may be combined together, for example, as layers of a composite material or as portions of the stop element connected together by a material connection. Also in this case, a region facing the other stop element may be configured to be non-elastic. A wide variety of shapes are conceivable both in the case of a stop element formed from elastomer and in the case of a stop element formed from plastic, for example such that the stop element is not configured to be solid but has one or more recesses. This may serve to adjust spring properties of the stop element and/or to save material and weight.

The leaf spring may advantageously be produced from a composite material. In particular, the leaf spring may consist at least partially from fiber-composite material. In this context, fiber-composite materials are all materials in which fibers, such as for example glass fibers, carbon fibers and/or aramid fibers, are embedded for reinforcement in a polymer matrix (for example a plastic or synthetic resin matrix). Optionally, in this case further particles, layers or components that are not able to be classified as polymers or fibers may be embedded therein or applied thereon. By the structure according to the disclosure, which provides the two stop elements, even in the case of a spring produced from composite material, an effective spring rate with at least two stages may be achieved, which is only possible with difficulty by a combination of leaf springs made of composite material.

With regard to a shape of the elastic stop or damper element a wide variety of possibilities are present, for example as mentioned above one or more recesses may be formed. Moreover, an effective spring constant of the elastic stop element may be influenced by the shape. According to one embodiment, the elastic stop element has a cross section that tapers toward the other stop element. In this case, primarily a part with the smaller cross section is initially deformed, whilst a part that is more rigid with the larger cross section is subjected to less deformation. In the case of a greater deformation, the elastic stop element has to be deformed further, which is only possible by a greater deformation of the part with the larger cross section. This in turn requires an intensified, in particular non-linear, increase in the restoring force. In this manner it may be ensured that, when the limit load is exceeded to a small extent, only a relatively small additional restoring force that increases slowly is produced by the stop element, whilst when the limit load is exceeded to a greater extent the additional restoring force increases rapidly.

According to a preferred embodiment, at least under normal load, the second stop element is arranged to a rear of the first stop element relative to the X-axis. In other words, when suspension deflection causes the first stop element to move to the rear, said rearward movement results in mutual contact of the two stop elements, corresponding to a rotation of the connecting arm about its upper end which is connected to the vehicle structure. By such an arrangement, for example, it is possible to achieve an effective cooperation of the stop elements when the connecting arm is arranged only at a small angle relative to the vertical. In this state, the connecting arm moves substantially horizontally along its tangential direction of movement, which is why an effective force transmission may be implemented more effectively when the second stop element is arranged to the rear of the first stop element. Naturally, in this embodiment, at the same time the second stop element may also be arranged along the Z-axis above the first stop element.

Further advantageous details and effects of the disclosure are described in more detail hereinafter with reference to an exemplary embodiment shown in the Figures, in which:

BRIEF DESCRIPTION OF THE DRAWINGS

FIG. 3 shows a side view of an axle suspension according to the disclosure according to a second embodiment under normal load; and FIG. 4 shows a side view of the axle suspension of FIG. 3 under limit load.

DETAILED DESCRIPTION

Figure 1:
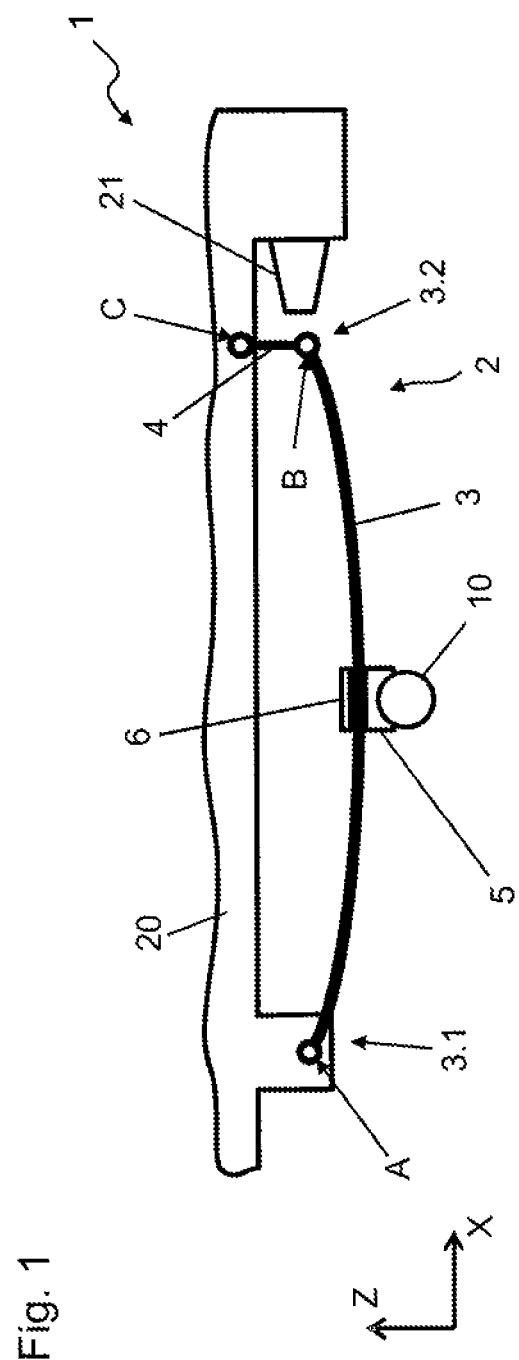
FIG. 1 shows a side view of an axle suspension according to the disclosure according to a first embodiment under normal load.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the various Figures, the same parts are always provided with the same reference numerals, which is why generally these parts are only described once.

FIG. 1 shows, in a highly schematic manner, a first embodiment of an axle suspension 1 which, for example, may be used in a truck. In this case, a rear axle 10 that is configured as a rigid axle is supported relative to a vehicle structure 20 by a leaf spring 3. The leaf spring 3 may advantageously be made of fiber-reinforced plastic. While the rear axle 10 extends parallel to a vehicle lateral axis (Y-axis), the leaf spring 3 extends generally longitudinally along a vehicle X-axis, but is not precisely parallel thereto. As is conventional and well known in the suspension art, the leaf spring 3 has a concave-up curvature within an X-Z plane. The leaf spring 3 has, at a front end 3.1, a first bearing eye, by which the leaf spring is pivotably connected to the vehicle structure 20 about a first pivot pin A. At a rear end 3.2, the leaf spring 3 has a second bearing eye by which the leaf spring is pivotably connected to a first end of a connecting arm 4 about a second pivot pin B. The second/opposite end of connecting arm 4 in turn is pivotably connected to the vehicle structure 20 about a third pivot pin C. A function of the connecting arm 4 is to take account of a changing distance between the ends 3.1, 3.2 during deformation/flexion of the leaf spring 3. The leaf spring 3, together with the connecting arm 4, is part of a spring assembly 2.

The leaf spring 2 is connected via a clamping device to a rear axle 10. In one possible embodiment, a lower clamping element 5 (for example by spring clips and nuts assigned thereto) is clamped onto an upper clamping element 6 and at the same time welded to the rear axle 10. Both clamping elements 5, 6 consist of steel. The leaf spring 3 may be clamped between the clamping elements 7, 8 by an interposition of damper cushions (not shown).

Along the X-axis, to a rear of the rear end 3.2 of the leaf spring 3, a damper element 21 is arranged on the vehicle structure, said damper element 21 being rigidly connected to the vehicle structure 20. The damper element 21 may consist of elastomer, for example rubber, or possibly of plastic. In the latter case, the damper element 21 may have recesses (not shown) that improve resilience. In FIG. 1, which corresponds to a normal load of the vehicle, the spring rear end 3.2 and the damper element 21 are spaced apart from one another. When the vehicle is loaded below a designated limit load, the resulting compression of the suspension causes a limited flattening of leaf spring 3 (and resulting increase in the distance between pivot pins A and B), and the spring assembly 2 does not contact the damper element 21. In such a case, a restoring force between the vehicle structure 20 and the rear axle 10 is determined only by the elastic properties of the leaf spring 3.

Figure 2:
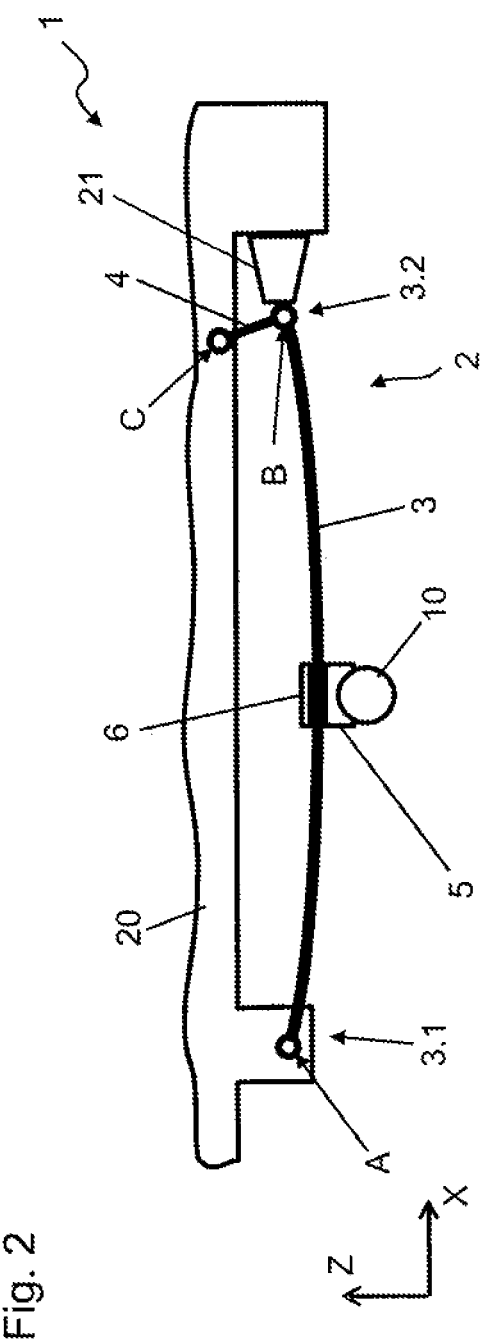
FIG. 2 shows a side view of the axle suspension of FIG. 1 under limit load.

This changes when a designated limit load is exceeded, which for example could be between 120% and 150% of the normal load. This state is shown in FIG. 2. In this case, the leaf spring elongates (the distance between pivot pins A and B increases) such that the spring assembly rear end 3.2 comes into contact with the damper element 21, as a result of the flattening of the curvature of the leaf spring 3 and the resulting elongation of the leaf spring and pivoting movement of the connecting arm 4. In this regard, the rear end 3.2 forms a first stop element and the rubber block 21 forms a second stop element. Further suspension compression may take place only as allowed by elastic deformation of the damper element 21 as necessary to permit elongation of the leaf spring (increase in the distance between pivots A and B), which is associated with an additional restoring force. In other words, an effective spring constant of the system is based on deformation of the leaf spring 3 and of the damper element 21. As depicted in FIG. 2, no visible deformation of the damper element 21 has yet taken place. With further suspension compression system (due to increased vehicle loading), the damper element 21 is deformed unevenly, which is due to the fact that the damper element 21 tapers in a direction of the rear end 3.2 of the leaf spring 3. The tapered end is able to be deformed more easily due to its smaller cross section. From a certain point, a further suspension compression is only possible by a significant deformation of thicker parts of the damper element 21, wherein the effective spring constant increases significantly.

FIG. 3 is a side view of a second embodiment of an axle suspension 1, which is largely identical to the embodiment shown in FIGS. 1 and 2, and is not described further. In this embodiment, however, the damper element 21 is configured to be smaller and extends downwardly from a lower face of the vehicle structure 20. In this case, a design consisting of elastomer or plastic is also possible. A further difference is that in this embodiment, the connecting arm 4 forms the first stop element. FIG. 3 shows in this case a state under normal load in which the connecting arm 4 and the damper element 21 are spaced apart from one another. When a limit load is exceeded, the connecting arm 4 strikes against the damper element 21 as shown in FIG. 4 and a further suspension compression results in a elastic deformation of the damper element 21, which in this case also leads to an increase in the effective spring constant.

In both embodiments shown, the constructional space adopted by the individual leaf spring 3 is small compared to a spring assembly. Moreover, the unsprung mass, part thereof being the spring assembly 2, is relatively small, since an increased spring constant is achieved by a compact component (the damper element 21), which is fastened to the vehicle structure 20 and thus forms a part of the sprung mass.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A suspension for a vehicle, comprising:
   a longitudinally-extending leaf spring having a first end pivotably connected to vehicle structure;
   a shackle having a first end pivotably connected to the vehicle structure and a second end pivotably connected to a second end of the leaf spring; and
   an elastically deformable stop attached to the vehicle structure adjacent the shackle, such that movement of the shackle caused by compression of the suspension moves the shackle into contact with the stop, wherein the stop tapers along a vehicle longitudinal axis from a relatively larger cross section adjacent to the vehicle structure to a relatively smaller cross section adjacent to the shackle.

2. The suspension as claimed in claim 1, wherein the stop is formed at least partially from an elastomer.

3. The suspension as claimed in claim 1, wherein the stop is formed at least partially from plastic.

4. The suspension as claimed in claim 1, wherein the leaf spring is produced from composite material.

5. The suspension as claimed in claim 1, wherein the second end of the leaf spring is a rearward end relative to the vehicle longitudinal axis and the stop is arranged rearward of the shackle.

6. A vehicle suspension, comprising:
   a leaf spring having a first end pivotably connected to vehicle structure;
   a shackle pivotably connecting a second end of the leaf spring to the vehicle structure; and
   an elastically deformable stop attached to the vehicle structure adjacent the shackle and spaced from the shackle when a suspension loading is below a limit load, suspension loading above the limit load causing the shackle to contact and deform the stop, wherein the stop tapers along a vehicle longitudinal axis from a relatively larger cross section adjacent to the vehicle structure to a relatively smaller cross section adjacent to the shackle.

7. The suspension as claimed in claim 6, wherein the stop is formed at least partially from an elastomer.

8. The suspension as claimed in claim 6, wherein the stop is formed at least partially from plastic.

9. The suspension as claimed in claim 6, wherein the leaf spring is produced from composite material.

10. The suspension as claimed in claim 6, wherein the second end of the leaf spring is a rearward end relative to the vehicle longitudinal axis and the stop is arranged rearward of the shackle.

11. A vehicle comprising:
    a longitudinally-oriented leaf spring having a first end pivotably connected to vehicle structure;
    a shackle pivotably connected between a second end of the leaf spring and the vehicle structure to permit movement of the second end of the leaf spring along a vehicle longitudinal axis during suspension compression; and
    an elastically deformable stop attached to the vehicle structure adjacent the shackle, movement of the shackle caused by suspension compression causing the shackle to rotate into contact with the stop, wherein the stop tapers along the vehicle longitudinal axis from a relatively larger cross section adjacent to the vehicle structure to a relatively smaller cross section adjacent to the shackle.

12. The vehicle as claimed in claim 11, wherein the stop is formed at least partially from an elastomer.

13. The vehicle as claimed in claim 11, wherein the stop is formed at least partially from plastic.

14. The vehicle as claimed in claim 11, wherein the leaf spring is produced from composite material.

15. The vehicle as claimed in claim 11, wherein the second end of the leaf spring is a rearward end relative to the vehicle longitudinal axis and the stop is arranged rearward of the shackle.

* * * * *